Feb. 5, 1935.  I. J. BOYD  1,990,369
WELDING HOOD
Filed March 8, 1934
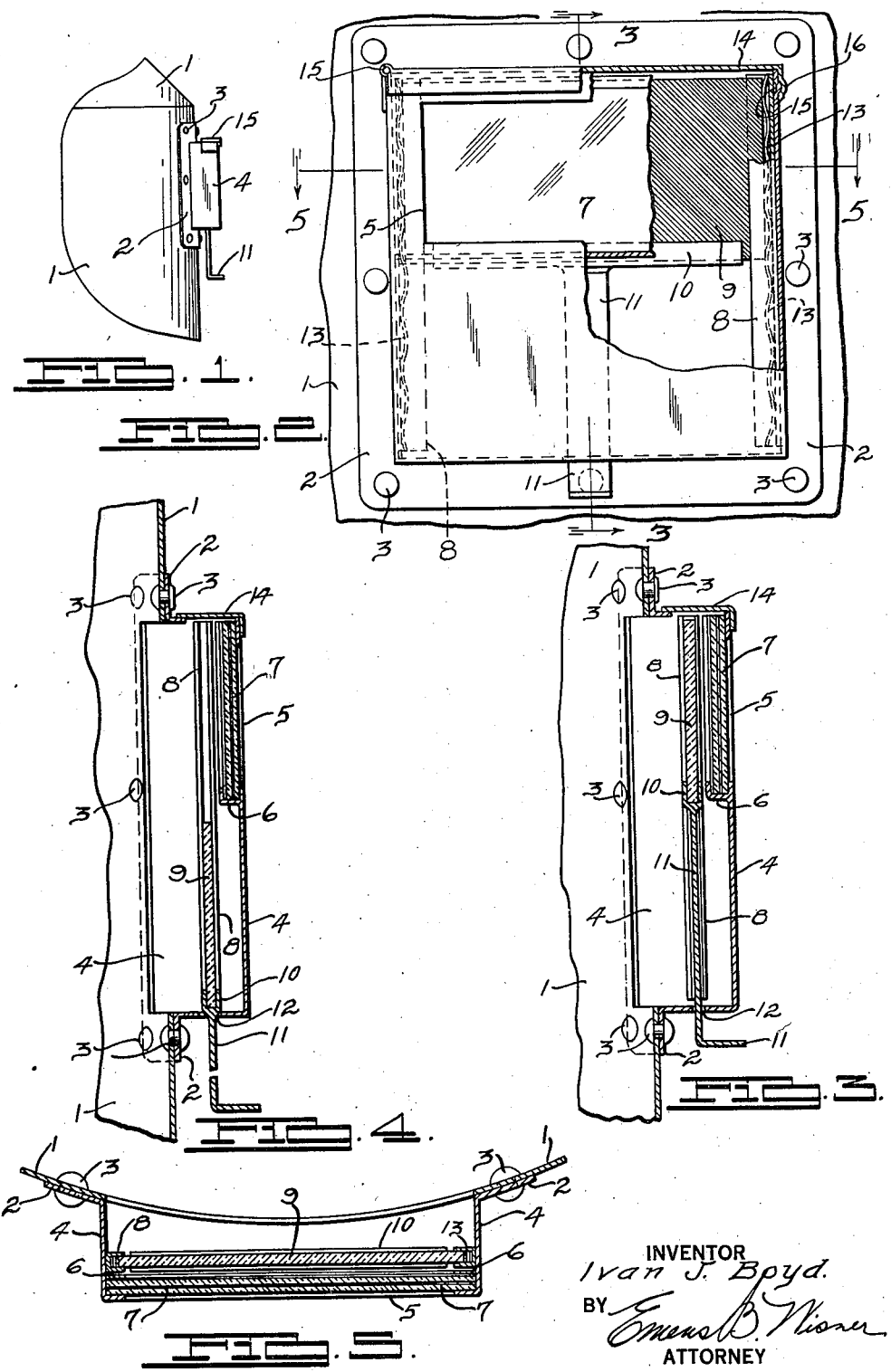
INVENTOR
Ivan J. Boyd.
BY
ATTORNEY Patented Feb. 5, 1935

1,990,369

UNITED STATES PATENT OFFICE 1,990,369

WELDING HOOD

Ivan J. Boyd, Flint, Mich.

Application March 8, 1934, Serial No. 714,601

1 Claim. (Cl. 2—8)

This invention relates to welding hoods and the object of the invention is to provide a welding hood to be worn on the head during welding and grinding operations and provided with an opening covered with clear glass and having a shaded glass panel slidable into or out of position behind the clear glass.

Another object of the invention is to provide a welding hood having a slidable shaded glass to protect the eyes during welding operations and having a laminated shatter proof glass panel through which the user may see by sliding the shaded glass panel out of the line of vision.

In the usual welding hood, a shaded glass is generally provided to protect the eyes of the user but after the welding operation, it is necessary to remove the hood when grinding off the rough parts of the weld and when inspecting the weld. This device seeks to provide a shaded glass for the hood which is movable out of the range of vision at which time, the wearer may inspect the weld through the clear shatter proof glass without removing the hood and the shatter proof glass allows the wearer to grind off the rough parts of the weld without the danger of flying particles from the grinding wheel being thrown into the user's eyes.

One of the particular objects of the invention is to provide a means for supporting the shaded glass behind the shatter proof glass so that it will remain in any position to which it is moved by the user.

These objects and the several novel features of the invention are hereinafter more fully described and claimed and the preferred form of construction by which these objects are attained is shown in the accompanying drawing in which—

Fig. 1 is an elevation of a welding hood embodying my invention.

Fig. 2 is an enlarged elevation of the casing for the shatter proof and shaded glass panels.

Fig. 3 is a section taken on line 3—3 of Fig. 2.

Fig. 4 is a similar section showing the shaded glass in the lowered position.

Fig. 5 is a section taken on line 5—5 of Fig. 2.

The welding hood 1, shown in Fig. 1, is of the usual type which is formed from strong fiber board or other suitable material and is provided with an opening and the flanges 2 are secured to the edges of the hood 1 about the opening by the rivets 3. The flanges 2 extend about the edge of a casing 4 and this casing is provided with an opening 5 about which channels 6 are provided on three sides to receive the laminated shatter proof glass panel 7, as shown in Figs. 3, 4 and 5.

A pair of channels 8 are secured to the opposite sides of the casing 1 and extend vertically the full length of the casing. Mounted in the channels 8 is a shaded glass panel 9 which is of sufficient size to cover the opening 5 and the shaded glass panel 9 is secured at the lower edge in a channel 10 to which the handle 11 is secured. This handle 11 extends through an opening 12 in the bottom of the casing so that the panel 9 may be moved up or down in the casing from the exterior of the casing by means of the handle 11.

In order to yieldably support the shaded glass panel 9 at any position to which it is moved, an undulating spring 13 is secured in the bottom of each channel 8 and the edges of the panel 9 engage against these springs to compress them slightly so that the panel is yieldably supported thereby and will not drop down and expose the user's eyes to the welding light. The upper edge of the casing is open and a lid 14 is provided to cover this opening and is hinged to the casing 4 at 15 so that it may be turned to the open position to allow removal or replacement of the glass panels 7 or 9. In order to secure the hinged lid 14 in place, the casing is provided with a pressed-out lug 15 and the lid is provided with a shallow recess 16 to engage over the lug 15 so that the lid is normally held in place by this arrangement.

In operation the hood is positioned on the head of the wearer so that the wearer's eyes are immediately behind the opening 5 in the casing. If the wearer is attempting a welding operation, he grasps the handle 11 and moves the shaded glass panel 9 to the position shown in Figs. 2 and 3 to protect his eyes from the brilliant welding light. If the wearer wishes to inspect the weld, he grasps the handle 11 and moves the shaded glass 9 down to the position shown in Fig. 4 so that he may inspect the weld through the clear shatter proof glass panel 7 after which time, he may again move the shaded glass 9 back to the position shown in Fig. 3 to continue the welding operation.

After the welding operation has been completed, it is usually necessary to grind off the rough spots produced by the weld and at this time the shade 9 may be again moved down to the position shown in Fig. 4 at which time, the wearer can grind off the rough spots and can inspect the grinding operation through the clear shatter proof glass 7. At the same time, the eyes of the wearer are protected from particles flying from the grinding wheel by the clear shatter proof glass and the time of removing the hood and replacing it after each inspection and during grinding is saved.

From the foregoing description, it becomes evident that the device is very simple and efficient in operation, will not easily get out of order, may be readily applied to the usual types of welding hoods and provides a device which accomplishes the objects described.

Having thus fully described my invention, its utility and mode of operation, what I claim and desire to secure by Letters Patent of the United States is—

In a welding hood having an opening, a casing secured to the hood and covering the opening, the casing having a vision opening, a channel about three sides of the vision opening, a clear shatter proof glass panel positioned in the said channels and covering the vision opening, a pair of vertical channels secured to each side of the casing, a shaded glass slidably mounted in the vertical channels, the casing being provided with an opening in the top above the channels through which the clear and shaded glass panels may be inserted in the respective channels, a cover hinged to the casing and covering the opening over the channels, means for securing the cover in the closed position, yieldable means supporting the shaded glass in the channels and a handle secured to the shaded glass panel and extending through the bottom of the casing.

IVAN J. BOYD.